(12) United States Patent
Lewis et al.

(10) Patent No.: US 7,265,865 B2
(45) Date of Patent: Sep. 4, 2007

(54) SECURITY FOR MASS STORAGE DEVICES IN IMAGING DEVICES

(75) Inventors: Johnny MacArthur Lewis, Whitehawk, CT (US); Gregory Alton Vaughn, Meridian, ID (US); Thomas Stanley Gale, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 863 days.

(21) Appl. No.: 10/175,108

(22) Filed: Jun. 19, 2002

(65) Prior Publication Data

US 2003/0234951 A1 Dec. 25, 2003

(51) Int. Cl.
G06K 15/00 (2006.01)
G06F 3/12 (2006.01)

(52) U.S. Cl. ............ 358/1.16; 358/1.14; 358/1.15

(58) Field of Classification Search ........ 358/1.16, 358/1.15, 1.14, 400, 1.1, 1.13, 403
See application file for complete search history.

(56) References Cited

U.S. PATENT DOCUMENTS 5,191,611 A * 3/1993 Lang ................ 705/53
5,720,036 A 2/1998 Garfinkle et al.
5,774,667 A * 6/1998 Garvey et al. .......... 709/222
6,366,744 B1 * 4/2002 Phillips et al. ........... 399/24
6,453,334 B1 9/2002 Vinson et al.
6,647,469 B1 * 11/2003 Sharma et al. .......... 711/147
6,839,810 B2 * 1/2005 Takahashi ............ 711/141

FOREIGN PATENT DOCUMENTS

EP 0794479 9/1997
EP 794479 A1 * 9/1997
KR 2002089849 5/2001

* cited by examiner

Primary Examiner—Douglas Q. Tran

(57) ABSTRACT

Imaging devices can have mass storage devices associated with them. In a networked environment that allows mounting of a shared resource, these mass storage devices can be viewed or even altered by anyone who can connect to the imaging device. However, unrestricted access may be undesirable. The various embodiments provide methods and apparatus for securing these mass storage devices. Security is variable among different sets of users or external devices attempting access of the mass storage device.

24 Claims, 3 Drawing Sheets

SECURITY FOR MASS STORAGE DEVICES IN IMAGING DEVICES

TECHNICAL FIELD OF THE INVENTION

The present invention relates generally to methods and apparatus for security of mass storage devices in imaging devices.

BACKGROUND OF THE INVENTION

Computer networks have greatly enhanced the ability of people and organizations to work together through increased communications. However, this advance in communications also brings with it a greater risk of unauthorized use or loss of valuable information. A variety of security measures have been adopted, such as isolated or secure networks, user passwords, hardware keys, etc.

Tangible output in a network is generated by devices broadly known as imaging devices. Imaging devices include printers, plotters, multi-function devices and other devices used for applying an image to a tangible print media, such as paper, transparencies, card stock and more. The image is applied to the print media using a marking material, e.g., ink, ribbon, toner, or other means of applying an image to the print media.

A variety of imaging devices are now available with mass storage devices. Examples may include printers having hard drives for storage of batch print jobs for printing during non-peak usage or storage of files that are routinely printed to avoid regenerating the print job whenever the print-out is desired. Other examples may include printers having slots for flash memory cards often used to transfer photographs from a digital camera to either tangible output or storage on a connected workstation. Once connected to a network, these mass storage devices are often viewable or even alterable from any device capable of communicating with the imaging device. Although standard security measures may be able to restrict unauthorized users of the network from accessing the mass storage device, even authorized network users can present a threat to the information contained on the mass storage device.

For the reasons stated above, and for other reasons stated below that will become apparent to those skilled in the art upon reading and understanding the present specification, there is a need in the art for alternative methods and apparatus for securing mass storage devices associated with imaging devices.

SUMMARY

Imaging devices can have mass storage devices associated with them. In a networked environment that allows mounting of a shared resource, these mass storage devices can be viewed or even altered by anyone who can connect to the imaging device. However, unrestricted access may be undesirable. For example, while viewing may be acceptable, modifying may not. Similarly, any access by some users or external devices may be unacceptable despite a desire to provide fill access to certain other users or external devices. The various embodiments provide methods and apparatus for securing these mass storage devices.

For one embodiment, the invention provides a method of operating an imaging device containing a mass storage device. The method includes receiving a first command object indicative of a desire to restrict access to the mass storage device and activating at least one protection for the mass storage device in response to the first command object. For a further embodiment, the method further includes receiving a second command object indicative of a desire to expand access to the mass storage device and removing at least some of the protections from the mass storage device in response to the second command object.

For another embodiment, the invention provides a method of operating an imaging device containing a mass storage device. The method includes restricting read privileges and/or write privileges to the mass storage device from at least one external device in response to receiving a first token and restoring, at least partially, a restricted privilege in response to receiving a second token.

For yet another embodiment, the invention provides an imaging device. The imaging device includes a formatter for rendering image data into a printable image, a print engine for producing a tangible output image from a printable image, a mass storage device for storing at least one of image data and printable images and a processor. The processor is adapted to recognize one or more access command objects and to respond to the access command objects by setting read and write privileges between the mass storage device and external devices.

For still another embodiment, the invention provides an imaging device. The imaging device includes a formatter for rendering image data into a printable image, a print engine for producing a tangible output image from a printable image and a mass storage device for storing at least one of image data and printable images. Access to the mass storage device is controllable through the use of command objects passed to the imaging device through a communication port.

For a further embodiment, the invention provides a computer-usable media having computer-readable instructions stored thereon capable of causing a processor to perform a method including recognizing a first command object indicative of a desire to restrict access to the mass storage device and activating at least one protection for the mass storage device in response to the first command object.

For a still further embodiment, the invention provides a computer-usable media having computer-readable instructions stored thereon capable of causing a processor to perform a method including restricting read privileges and/or write privileges to the mass storage device for at least one external device in response to receiving a first token indicating a desire to restrict access to the mass storage device and restoring, at least partially, a restricted privilege in response to receiving a second token indicating a desire to expand access to the mass storage device.

Further embodiments of the invention include apparatus and methods of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
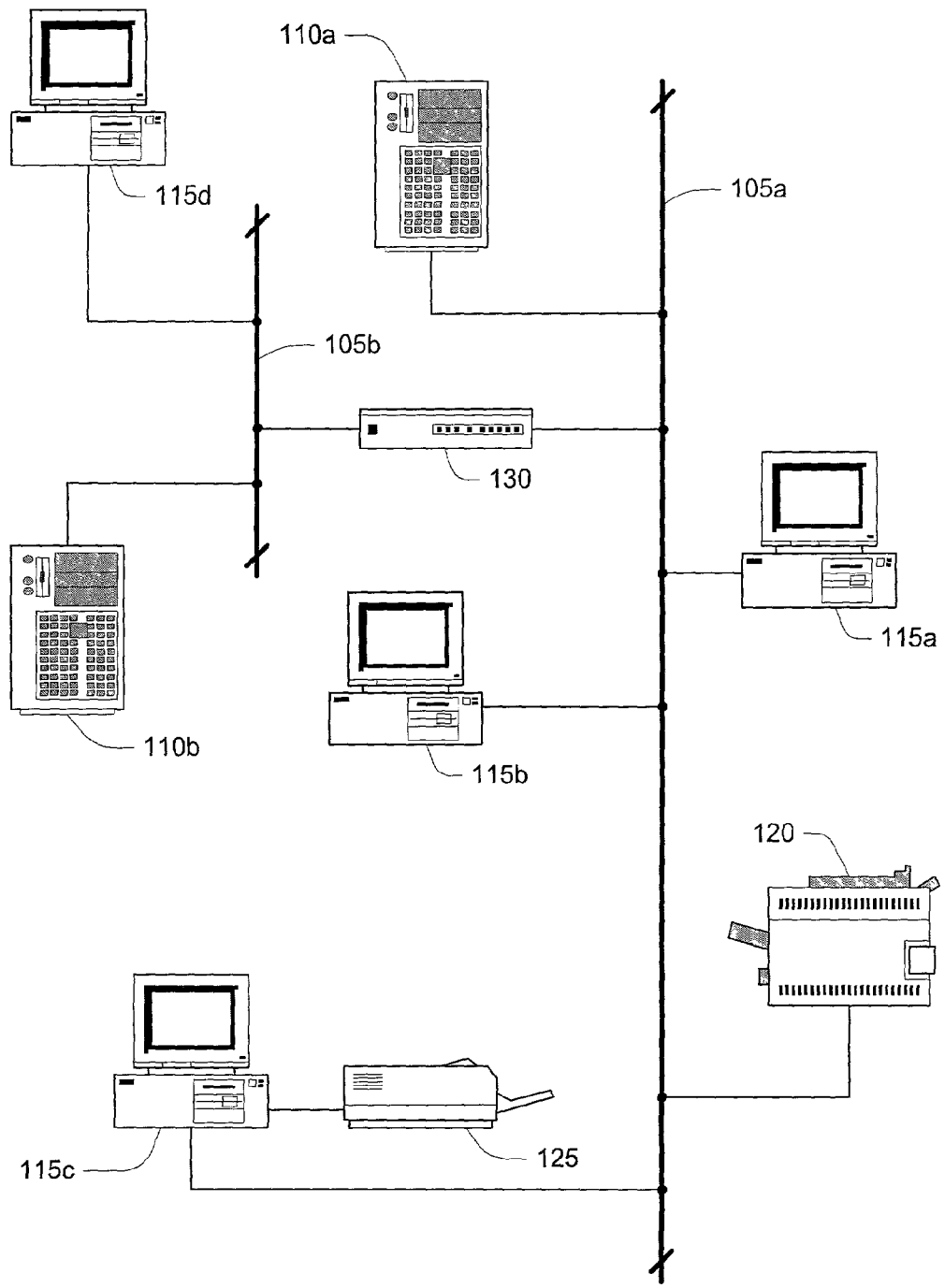
FIG. 1 is a computer network in accordance with an embodiment of the invention.

FIG. 1 is a computer network in accordance with an embodiment of the invention. The network may contain one or more local networks 105 in communication with each other through bridges 130. Each network 105 may be coupled directly to a variety of network devices, such as servers 110, computer workstations 115 and network imaging devices 120. Other network devices may be coupled to the network 105, albeit indirectly. An example includes imaging device 125 coupled to the network 105a through computer workstation 115c. While the imaging device 125 may be accessible via the network, and thus be considered a network device, it is local only to those external devices having a direct connection to the imaging device 125, e.g., the computer workstation 115c as depicted in FIG. 1. The connection between a network device and a network 105 may be by a hardwired connection, a wireless connection, a combination of hardwired and wireless connections, or some other communication link.

At least one of the imaging devices 120, 125 has a mass storage device. The Network File System (NFS) protocol generally allows visibility of these mass storage devices to external devices, such as other network devices. In addition, these external devices are often allowed to mount the mass storage device. While NFS is capable of granting or denying access to, and setting permissions on, a network-connected mass storage device, NFS only affects users accessing the mass storage device through the network. Local access, such as through a parallel port, IR port, USB port or other direct communication path, is not affected by the NFS restrictions. Similarly, changes to the NFS restrictions require network access. At least one of the imaging devices having a mass storage device is adapted to perform one or more methods of the various embodiments of the invention to control access to its mass storage device through a print communication path, whether that is a network or local connection to the imaging device.

Figure 2:
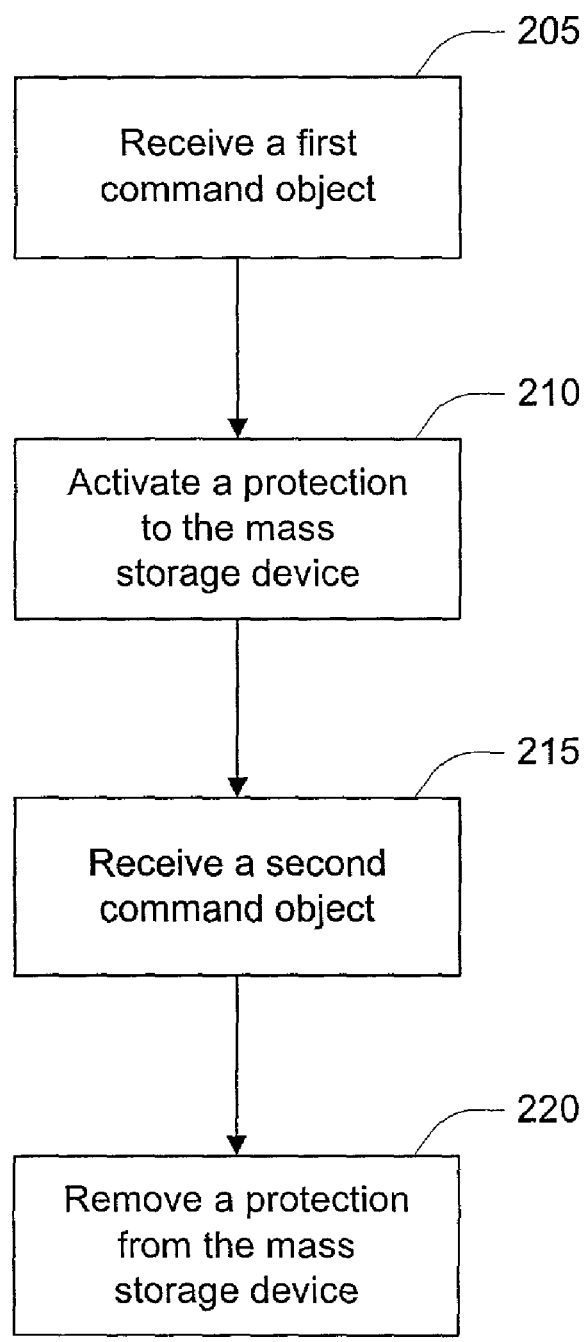
FIG. 2 is a flowchart of one method of operating an imaging device in accordance with an embodiment of the invention.

FIG. 2 is a flowchart of one method of operating an imaging device in accordance with an embodiment of the invention. At 205, a first command object is received by an imaging device. The command object can be any token or other data stream recognizable by the imaging device. The first command object is indicative of a desire to restrict access to a mass storage device of the imaging device. The use of command objects with imaging devices is well understood and the mechanics of such will not be detailed herein. Examples of typical command objects include objects directing the imaging device to change media sources, resolution settings, cancel pending print jobs, etc. These command objects are generally part of a management language developed by the imaging device manufacturer in support of the imaging device. Accordingly, the management language would need to be modified to support access command objects as described herein.

In response to the first command object, the imaging device activates a protection to its mass storage device. For one embodiment, activating a protection includes restricting communication with the mass storage device. Such restriction may be between the mass storage device and one or more external devices defined by the first command object. For example, the first command object may indicate a desire to restrict communications between the mass storage device and any external device or between the mass storage device and some defined set of external devices. Different sets of external devices may be subjected to different sets of protections, restrictions and privileges. As one example, the first command object may define a first set as any external device communicating with the imaging device through a first communication port and a second set as any external device communicating with the imaging device through a second communication port. Sets of external devices may be defined by what local network they reside on, what server they are associated with, what bridge they communicate through, what port they communicate through, what protocol they communicate with, what user or group is authorized on a device, whether or not the device is local to the imaging device, etc. Restricting communication may further take the form of setting read and write privileges for the external devices.

Restricting communication may further take the form of disabling the mass storage device's communication protocol. For example, an imaging device's mass storage device may be viewed within a network file system using TCP/IP (Transmission Control Protocol/Internet Protocol). TCP/IP is the basic communication language or protocol of the Internet as well as a common communications protocol in many private networks. Communication is enabled by creating a socket to the desired device, which specifies a port number and address to talk to the device without knowing any low-level details of the device's operation. Communication with the device is then carried out through object or function calls. To restrict communication, the socket could be disabled, thus removing visibility of the device and disabling communication with network devices. Restoring the socket could be accomplished through a local device In addition to restricting access to the mass storage device, it may also be desirable to expand or restore a previously-restricted access. This can be accomplished using a second access command object indicating a desire remove protections from the mass storage device. Accordingly, at 215 a second command object is received by the imaging device. In response to the second command object, the imaging device removes, at least partially, a prior protection to the mass storage device. For one embodiment, the first command object and the second command object are the same command object, differing only in their associated values. For example, an access command object may signal to the imaging device that data following the command object is representative of desired read and write privileges to the mass storage device. An access command object indicating a desire to restore access in one area is allowed to also restrict access in another area. For example, a first command object may initiate a removal of write privileges to the mass storage device, but leaves read privileges intact, while a second command object may restore write privileges to the mass storage device while simultaneously removing read privileges.

For additional security, the access command objects, at least those expanding access to the mass storage device, should be accompanied by some express or implied security. As one example, the authorization may be that the command object is received from a local external device. As another example, the command object may be password protected, requiring a user or administrator to provide a valid password before the removal of protections will be carried out. Additionally, the access command objects may set privileges for a single access of the mass storage device. As an example, a user attempting access of a mass storage device of an imaging device may supply the imaging device with an access command object and an appropriate authorization that only modifies the privilege settings for that access request.

Figure 3:
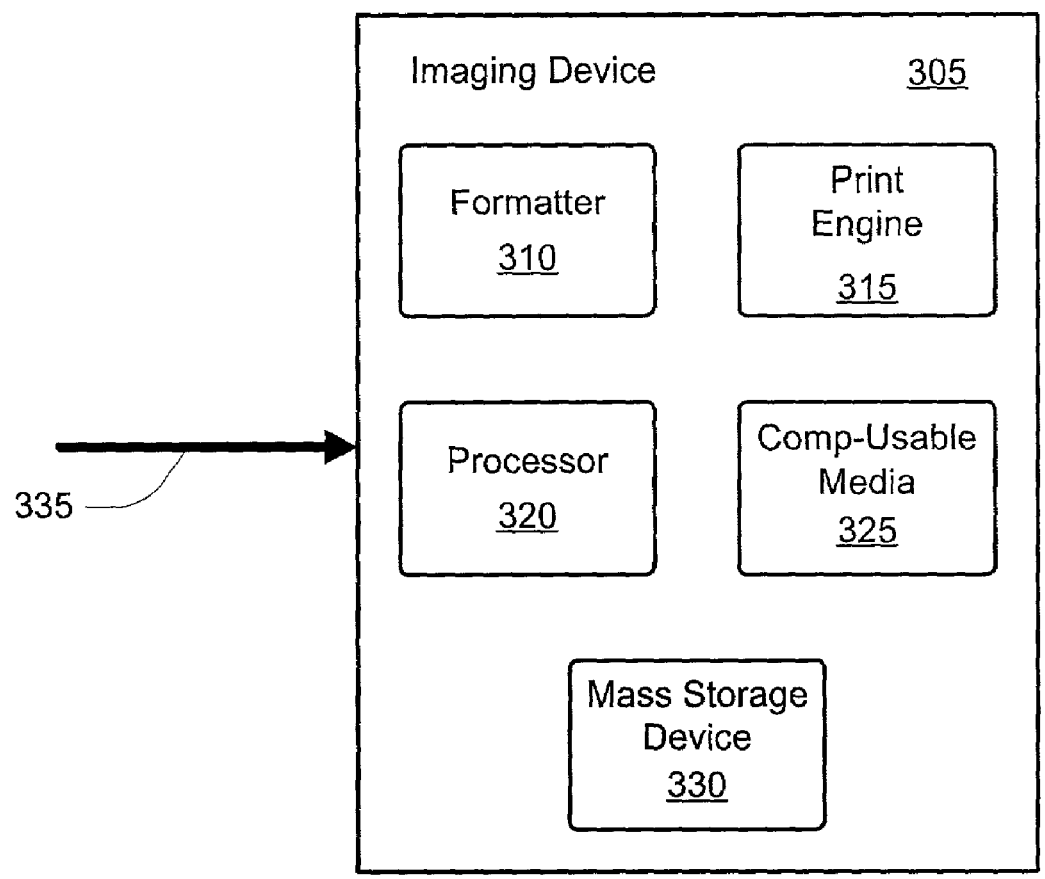
FIG. 3 is an imaging device in accordance with an embodiment of the invention.

FIG. 3 is an imaging device in accordance with an embodiment of the invention. The imaging device 305 has a formatter 310 for interpreting and rendering image data into a printable image. The printable image is provided to a print engine 315 to produce a tangible output image on a print media. The print engine 315 represents the mechanical aspects of the imaging device 305. The image data for use by the formatter 310 may be received via a communication port 335 or stored on a mass storage device 330. Similarly, the mass storage device 330 may store printable images for use directly by the print engine 315 without further rendering by the formatter 310. The imaging device 305 can have more than one communication port 335. For example, the imaging device 305 may have an IR (infrared) port and a USB (universal serial bus) port.

The mass storage device 330 is any device used for the nonvolatile storage of information and may be permanently fixed to or within the imaging device 305, such as a fixed hard drive, or it may be removable from the imaging device 305, such as a flash memory card or a floppy disk. Other examples of mass storage devices include magnetic disks or tapes, optical disks, and nonvolatile semiconductor memory modules or cards, whether fixed or removable.

The imaging device 305 includes a processor 320 and computer-usable media 325. The processor 320 is adapted to perform one or more methods of the various embodiments of the invention in response to computer-readable instructions. These computer-readable instructions may be in the form of either software, firmware or hardware. In a hardware solution, the instructions are hard coded as part of a processor, e.g., an application-specific integrated circuit (ASIC) chip. In a software or firmware solution, the instructions are stored on a separate computer-usable media 325 for retrieval by the processor 320. Some examples of computer-usable media include static or dynamic random access memory (SRAM or DRAM), read-only memory (ROM), electrically-erasable programmable ROM (EEPROM or flash memory), magnetic media and optical media, whether fixed or removable. Most computer applications are software solutions provided to the user on some removable computer-usable media, such as a compact disc read-only memory (CD-ROM). For one embodiment, the computer-usable media 325 is the mass storage device 330. For another embodiment, the processor 320 is part of the formatter 310.

For one embodiment, the processor 320, in response to the computer-readable instructions, is adapted to recognize one or more access command objects and to respond to these objects by setting read and write privileges between the mass storage device 330 and one or more external devices through a communication port 335. In general, the processor 320, in response to the computer-readable instructions and the access command objects, is adapted to control access to the mass storage device 330.

CONCLUSION

Imaging devices can have mass storage devices associated with them. In a networked environment that allows mounting of a shared resource, these mass storage devices can be viewed or even altered by anyone who can connect to the imaging device. However, unrestricted access may be undesirable. The various embodiments provide methods and apparatus for securing these mass storage devices.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A method of operating an imaging device containing a mass storage device, comprising:
  receiving, through a print communication path of the imaging device, a first command object indicative of a desire to restrict access to the mass storage device by a device external to the imaging device, wherein the command object is included in a management language of the imaging device; and
  activating at least one protection for the mass storage device in response to the first command object;
  wherein the at least one protection comprises at least one protection controlling local access to the mass storage device through a direct communication path of the imaging device.

2. The method of claim 1, further comprising:
  receiving a second command object indicative of a desire to expand access to the mass storage device; and
  removing at least some of the protections from the mass storage device in response to the second command object.

3. The method of claim 1, wherein activating at least one protection further comprises restricting communication with the mass storage device.

4. The method of claim 3, wherein restricting communication further comprises restricting communication between the mass storage device and at least one external device defined by the first command object.

5. The method of claim 4, wherein the at least one external device comprises all external devices.

6. The method of claim 4, wherein the at least one external device comprises a class of external devices.

7. The method of claim 6, wherein the class of external devices is any external device communicating with the imaging device through a communication port defined by the first command object.

8. A method of operating an imaging device containing a mass storage device, comprising:
  restricting at least one of read privileges and write privileges to the mass storage device from at least one external device in response to receiving a first token through a print communication path of the imaging device; and
  restoring, at least partially, a restricted privilege in response to receiving a second token.

9. The method of claim 8, wherein the at least one external device is a set of external devices as defined by the first token.

10. The method of claim 9, wherein the set of external devices comprises one or more classes of devices selected from the group consisting of each external device communicating with the imaging device through a specified communication port; each external device communicating with the imaging device through a specified network bridge; each external device communicating with the imaging device using a specified communication protocol; and each external device that is not local to the imaging device.

11. The method of claim 8, wherein restricting at least one of read privileges and write privileges further comprises restricting different privileges for different sets of external devices.

12. An imaging device, comprising:
a formatter for rendering image data into a printable image;
a print engine for producing a tangible output image from a printable image;
a mass storage device for storing at least one of image data and printable images;
at least one communications port adapted for coupling to an external device;
a print communication path adapted to receive through the communications port the image data and one or more command objects adapted to control access by at least one external device to the mass storage device;
wherein read and/or write privileges for at least local access between the mass storage device and the external devices are controllable through the use of the command objects.

13. The imaging device of claim 12, wherein command objects for removing restrictions to the read and/or write privileges between the mass storage device and the one or more devices external to the imaging device must be accompanied by an authorization.

14. The imaging device of claim 13, wherein the authorization is a password.

15. The imaging device of claim 12, wherein controlling read and/or write privileges further comprises limiting communication to the mass storage device to one or more communication ports specified by the command object.

16. The imaging device of claim 12, wherein controlling read and/or write privileges further comprises limiting communication between the mass storage device and one or more classes of external devices specified by the command object.

17. A computer-usable media having computer-readable instructions stored thereon capable of causing a processor to perform a method, the method comprising:
recognizing a first command object indicative of a desire to restrict access to a mass storage device of an imaging device, the first command object received through a print communication path of the imaging device; and
activating at least one protection for the mass storage device in response to the first command object;
wherein the at least one protection comprises at least one protection controlling local access to the mass storage device through a direct communication path of the imaging device.

18. The computer-usable media of claim 17, wherein the method further comprises:
recognizing a second command object indicative of a desire to expand access to the mass storage device; and
removing at least some of the protections from the mass storage device in response to the second command object.

19. The computer-usable media of claim 17, wherein activating at least one protection further comprises restricting communication with the mass storage device.

20. The computer-usable media of claim 19, wherein restricting communication further comprises restricting communication between the mass storage device and at least one external device defined by the first command object.

21. A computer-usable media having computer-readable instructions stored thereon capable of causing a processor to perform a method, the method comprising:
restricting at least one of read privileges and write privileges to a mass storage device of an imaging device for at least one device external to the imaging device in response to receiving a first token through a print communication path of the imaging device indicating a desire to restrict access to the mass storage device; and
restoring, at least partially, a restricted privilege in response to receiving a second token through a print communication path of the imaging device indicating a desire to expand access to the mass storage device.

22. The computer-usable media of claim 21, wherein the at least one device external to the imaging device is a set of devices external to the imaging device as defined by the first token.

23. The computer-usable media of claim 22, wherein the set of devices external to the imaging device comprises one or more classes of devices selected from the group consisting of each external device communicating with the imaging device through a specified communication port; each external device communicating with the imaging device through a specified network bridge; each external device communicating with the imaging device using a specified communication protocol; and each external device that is not local to the imaging device.

24. The computer-usable media of claim 21, wherein restricting at least one of read privileges and write privileges further comprises restricting different privileges for different sets of devices external to the imaging device.

* * * * *

UNITED STATES PATENT AND TRADEMARK OFFICE
CERTIFICATE OF CORRECTION

PATENT NO. : 7,265,865 B2 Page 1 of 1
APPLICATION NO. : 10/175108
DATED : September 4, 2007
INVENTOR(S) : Johnny MacArthur Lewis et al.

It is certified that error appears in the above-identified patent and that said Letters Patent is hereby corrected as shown below:

In column 1, line 60, delete "fill" and insert -- full --, therefor.

In column 7, line 22, in Claim 12, delete "devices" and insert -- device --, therefor.

Signed and Sealed this

Nineteenth Day of August, 2008

JON W. DUDAS
*Director of the United States Patent and Trademark Office*